United States Patent [19]

Obermeier

[11] Patent Number: 5,349,491
[45] Date of Patent: Sep. 20, 1994

[54] PRE-STRESSED PRESSURE TRANSDUCER AND METHOD OF FORMING SAME

[75] Inventor: Horst Obermeier, Huellhorst, Fed. Rep. of Germany

[73] Assignee: Kavlico Corporation, Moorepark, Calif.

[21] Appl. No.: 973,088

[22] Filed: Nov. 6, 1992

[51] Int. Cl.⁵ .................................. H01G 7/00
[52] U.S. Cl. ................................ 361/283.4; 73/718
[58] Field of Search ................ 361/283; 73/715, 718, 73/724; 29/25.42, 621.1; 338/36, 42

[56] References Cited

U.S. PATENT DOCUMENTS

| | | | |
|---|---|---|---|
| 3,697,835 | 10/1972 | Satori | 361/283 |
| 4,073,191 | 2/1978 | Saigusa | 361/283 |
| 4,227,419 | 10/1980 | Park | 361/283 |
| 4,388,668 | 6/1983 | Bell et al. | 361/283 |
| 4,458,537 | 7/1984 | Bell et al. | 361/283 |
| 4,617,607 | 10/1986 | Park et al. | 361/283 |
| 4,670,733 | 6/1987 | Bell | 338/36 |
| 4,798,089 | 1/1989 | Frick et al. | 73/718 |
| 4,870,536 | 9/1989 | Delatorre | 361/283 |
| 4,879,627 | 11/1989 | Grantham | 361/283 |
| 4,905,575 | 3/1990 | Knecht et al. | 73/718 |
| 4,949,581 | 8/1990 | Rud, Jr. | 361/283 |
| 5,022,270 | 6/1991 | Rud, Jr. | 361/283 |
| 5,094,109 | 3/1992 | Dean et al. | 361/283 |
| 5,134,887 | 8/1992 | Bell | 361/283 |

Primary Examiner—Bruce A. Reynolds
Assistant Examiner—Gregory L. Mills
Attorney, Agent, or Firm—Poms, Smith, Lande & Rose

[57] ABSTRACT

A pre-stressed capacitive pressure transducer is disclosed which is capable of withstanding an applied high pressure. The transducer incorporates a pre-stress mechanism comprising upper and lower pre-stress members which are welded together to apply a compressive force to the transducer sealing means. The compressive force serves to improve the transducer seal resistance to high pressure damage. The pre-stress mechanism may also be adapted to provide additional overpressure protection by bottoming out against the transducer input flange. A method of forming such a pre-stressed transducer is also disclosed. The pre-stress mechanism and method can be easily adapted to meet the requirements of a wide variety of transducers without requiring modification of the transducer internal design parameters.

3 Claims, 2 Drawing Sheets

PRE-STRESSED PRESSURE TRANSDUCER AND METHOD OF FORMING SAME

BACKGROUND OF THE INVENTION

1. Field of the Invention

The present invention relates to capacitive pressure transducers. More particularly, the present invention relates to a pre-stressed pressure transducer designed to withstand the application of high pressure.

2. Description of Related Art

Pressure transducers convert an applied pressure to a readily ascertainable electrical quantity, thereby facilitating the measurement and regulation of pressure in a wide variety of applications. Exemplary capacitive pressure transducers to which the pre-stressed pressure transducer of the present invention is related are disclosed in U.S. Pat. No. 4,388,668, and U.S. Pat. No. 4,227,419, both assigned to the assignee of the present invention. These exemplary pressure transducers use a flexible measuring diaphragm and at least one additional fixed disk, both of which have a conductive surface. The conductive surfaces form the plates of a capacitor. The distance between the plates varies in response to applied pressure, as the measuring diaphragm flexes, and the pressure is thereby converted into a change in capacitance. The change in capacitance is detected via external circuitry to provide an accurate measure of the applied pressure.

In the pressure transducers described above, the diaphragm and associated fixed disk are sealed together via a sealing means, typically a glass frit. This seal is essential to the operation of the device, since any leakage or exposure to the external environment will alter the relative positions of the conductive surfaces and thereby disturb the accuracy of the resultant pressure measurement. The seal also typically serves to space the surfaces apart to establish an initial capacitance value.

Pressure transducers such as those described above are relatively inexpensive and have been widely used in engine control and other applications in which there is a danger that excessive pressure will be applied to the pressure transducer. High pressure surges can come about in conventional applications, for example, through an error or failure in a system using a dual differential transducer with two pressure inputs where the pressure is inadvertently removed from one of the inputs, creating a high pressure within the device. An internal high pressure condition might also result from backfire in an engine incorporating the sensor. The high pressure may damage the sealing means, substantially reducing the accuracy of subsequent measurements. In the case of the glass frit seal, cracked glass and a damaged seal can occur because the glass frit is weak under the tension force resulting from the internal high pressure. Other sealing means suffer from similar drawbacks. The transducer seal weakness and vulnerability to failure thus represent a significant obstacle to the accurate and cost-effective use of pressure transducers within the many applications in which high pressure may be either purposely or inadvertently applied.

Under current practice, protection for the measuring diaphragm is typically incorporated into transducer designs by allowing the diaphragm to bottom out against a fixed surface in the event of overpressure. U.S. Pat. No. 4,073,191 incorporates this feature into a differential pressure transducer. See column 3, lines 35 to 39. U.S. Pat. No. 4,905,575 illustrates a transducer with a diaphragm and base plates having contoured surfaces and recesses, respectively, in order to protect the diaphragm under excessive pressure. See FIG. 1 and column 3, lines 33 to 38. However, these features do not sufficiently protect the transducer sealing means, since internal high pressure can still increase even if the diaphragm is bottomed out.

Efforts to develop protective mechanisms for the entire transducer rather than just the measuring diaphragm have led to a number of specially designed devices for use in high pressure applications. One such device, disclosed in U.S. Pat. No. 4,617,607 and assigned to the present assignee, uses a flexible stainless steel diaphragm to block external high pressure fluid from damaging the glass frit seal of the transducer. See column 2, lines 38 to 41 and column 3, lines 2 to 17. This device requires a redesign of the internal structure of the transducer, since the metal diaphragm must seal off the high pressure region and be brought into contact with the measuring diaphragm. U.S. Pat. No. 4,879,627 illustrates another specially designed transducer with overpressure protection using dual diaphragms and overpressure stops. See FIG. 1 and column 6, lines 14 to 30. Other special overpressure designs of greater complexity are found in U.S. Pat. No. 4,949,581 and U.S. Pat. No. 5,022,270.

However, no suitable mechanism exists which can provide simple and inexpensive overpressure protection for transducer sealing means regardless of the internal design features. As mentioned above, these transducers are susceptible to high pressure surges despite being used in applications that may be for the most part low pressure. Known specially designed high pressure transducers do not disclose techniques which may be easily applied to conventional transducers to substantially increase the strength of the seals and the resistance of the device to internal high pressure conditions.

As is apparent from the above, there presently is a need for a pre-stressed pressure transducer which incorporates a simple mechanism and method for increasing the strength of the transducer seals. The mechanism and method should provide a substantial increase in seal strength without altering the internal design of the transducer, and should be applicable to a wide variety of transducers used in both low and high pressure applications. Furthermore, the mechanism should complement additional transducer high pressure protection features.

SUMMARY OF THE INVENTION

In accordance with the present invention, a pre-stressed capacitive pressure transducer is provided which incorporates a simple mechanism for improving resistance to high pressure damage. The pre-stressed transducer includes a flexible ceramic diaphragm, a pair of ceramic disks mounted on either side of the diaphragm, and a means for applying pressure to the diaphragm. The diaphragm and at least one of the disks have conductive plates on facing surfaces such that the capacitance between the plates varies as the diaphragm flexes under an applied pressure. The diaphragm and the disks are secured together and spaced apart by a glass frit seal. The diaphragm, disks, and glass frit seal are subject to the compressive force applied by the pre-stress mechanism consisting of overlapping upper and lower cylindrical pre-stress members, secured together by welding, which apply pressure to the outer surfaces of the ceramic disks.

As a feature of the present invention, the pre-stress mechanism applies a compressive force to the sealing means of the transducer such that the strength of the sealing means and its resistance to high pressure damage is significantly increased.

As another feature of the present invention, the pre-stress mechanism may be applied to conventional pressure transducers without altering the internal transducer design features. Thus, additional resistance to high pressure damage may be incorporated into many different transducers without the use of a special high pressure design.

In accordance with another aspect of the present invention, the material from which the pre-stress mechanism is constructed has a coefficient of expansion which is matched to that of the diaphragm and the fixed disks so as to provide an even application of pre-stress force under a wide range of temperature conditions.

As an additional feature of the present invention the upper and lower pre-stress members of the pre-stress mechanism are welded together under compression to provide a desired quantity of pre-stress force to the pressure transducer sealing means. The mechanism can thus easily accommodate the pre-stress requirements of a variety of different pressure transducer sealing means, including but not limited to glass frits, active metal soldering, gaskets, or O-rings.

The pressure transducer of the present invention may also include a pair of input flanges having channels or passageways through them, for applying pressure to be measured to the outer surfaces of each of the ceramic disks on either side of the diaphragm. The ceramic disks have holes through them for the transmission of pressure to the diaphragm via an incompressible fluid. However, such structure is in addition to the basic pre-stressing structure which is applied at very high force to the outer periphery of the ceramic disks.

As a further feature of the present invention a pre-stress mechanism is provided which, in addition to increasing seal strength, can be adapted to bottom out against the input flange or other fixed surface of the transducer in order to provide additional overpressure protection. Sensor designers using the pre-stress mechanism of the present invention can thus incorporate additional high pressure protection without extra design effort by taking advantage of the pre-stress mechanism bottoming out feature.

In accordance with another aspect of the present invention, the use of the pre-stress mechanism can complement other high pressure resistance features of a given sensor. For example, in a preferred embodiment of the present invention, the pre-stressed transducer also incorporates a pair of separating diaphragms which are secured to the fixed ceramic disks. These separating diaphragms will bottom out against the outer surface of the ceramic disks in the event of an externally applied high pressure, and thereby limit the amount of external pressure applied to the measuring diaphragm. The pre-stress members do not interfere with, but instead complement, additional high pressure protection features such as these.

The present invention further provides a simple and efficient method of forming a pre-stress mechanism. Use of this method can eliminate the additional time and expense of high pressure design efforts currently required to improve resistance to high pressure damage.

The above-discussed features and attendant advantages of the present invention will become better understood by reference to the following detailed description of the preferred embodiments and the accompanying drawings.

DETAILED DESCRIPTION OF THE PREFERRED EMBODIMENT

The present invention is based upon the discovery of a simple mechanism and method for increasing the strength of pressure transducer sealing means. Although the following detailed description is directed to the mechanism and method as applied to one exemplary pressure transducer, it should be understood that this is by way of illustration and not limitation. The mechanism and method of the present invention can be used with a wide variety of different pressure transducer designs.

Figure 1:
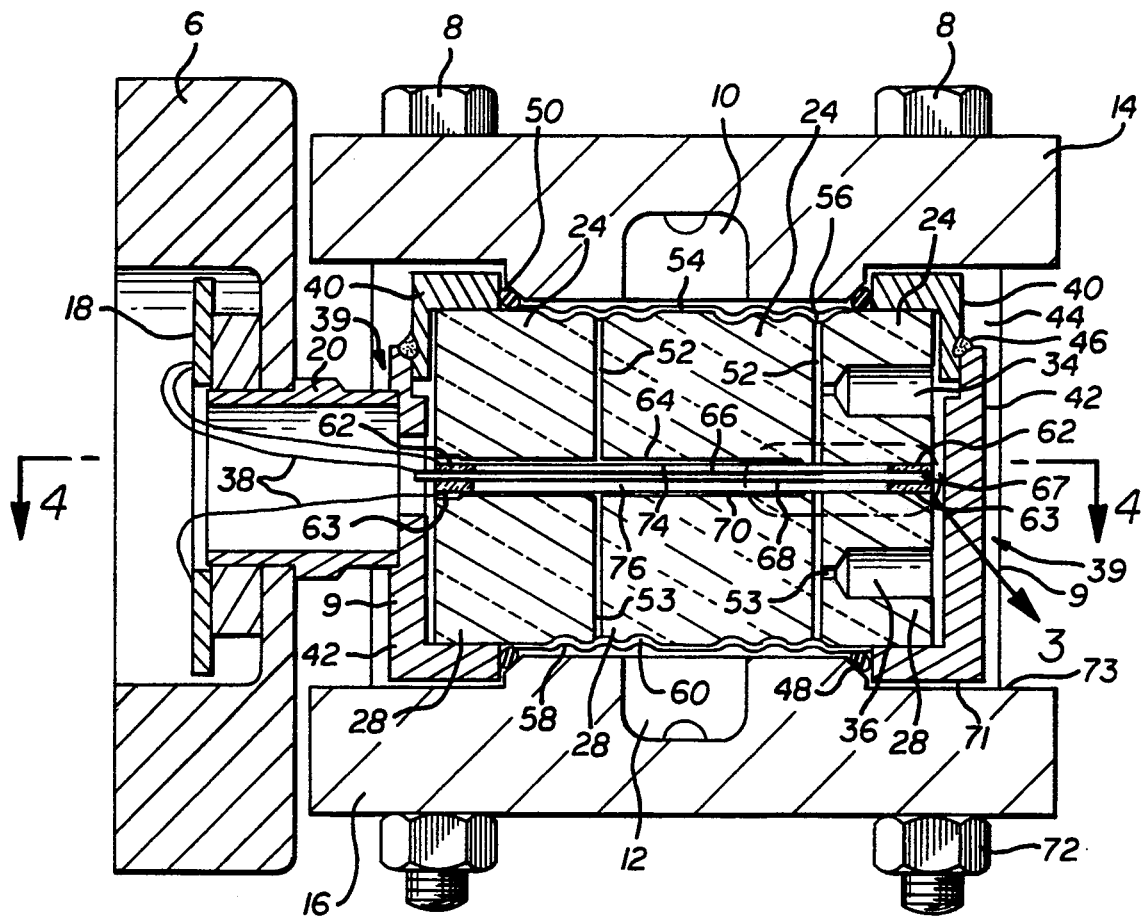
FIG. 1 is a side sectional view of an exemplary pre-stressed pressure transducer constructed in accordance with the present invention.
Figure 2:
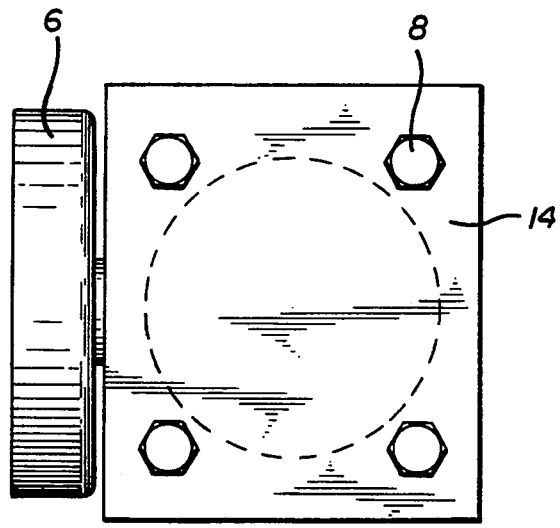
FIG. 2 is a top-down view of the exemplary pressure transducer of FIG. 1.
Figure 4:
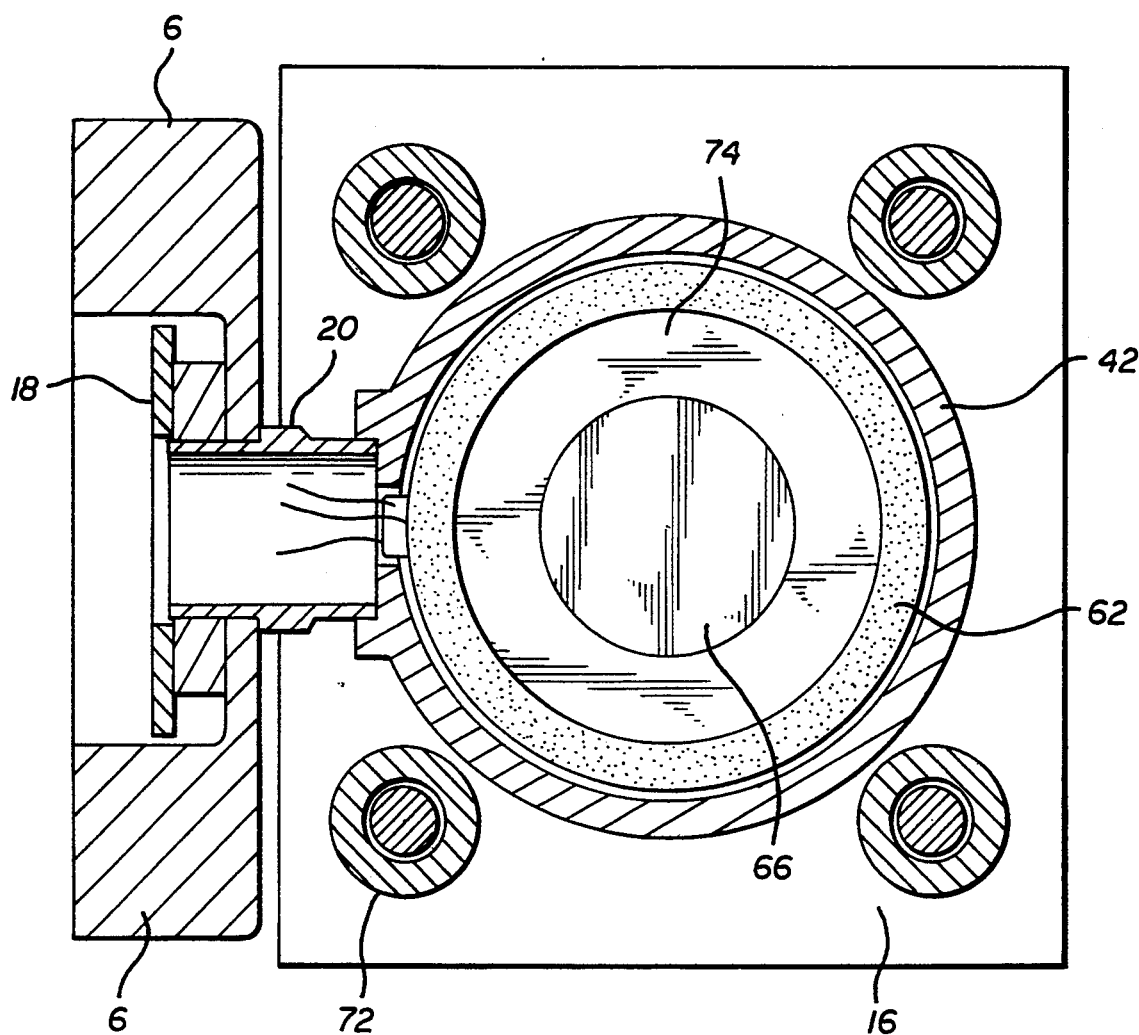
FIG. 4 is a sectional view of the exemplary pressure transducer of FIG. 1 taken along the 4—4 plane.

The exemplary transducer shown in FIG. 1 is a differential transducer with two pressure input flanges 14, 16 and two ceramic fixed disks 24, 28. This design in effect incorporates two pressure transducers arranged symmetrically about a common ceramic measurement diaphragm 67. Each fixed disk and diaphragm interface is capable of acting independently if the input on the opposite side is held at a fixed pressure. In this exemplary transducer, the input flanges 14, 16 and pre-stress mechanism 39 are secured to an external mounting flange 6 by a tube 20, as seen in FIGS. 1, 2 and 4. The upper and lower input flanges 14, 16 are connected together via bolts 8 arranged through cylindrical tubes 44 and secured with nuts 72.

The exemplary differential pressure transducer operates as follows. The transducer is arranged within a system such that the upper pressure input flange 14 is in contact with one variable pressure source, and the lower pressure input flange 16 is in contact with a second variable pressure source. The desired measurement is the pressure difference between the pressure sources contacting the upper and lower pressure input flanges 14, 16. The input flanges 14, 16 have channels 10, 12 through them, for transferring the pressure to be measured from the input flange to the separating diaphragms 54, 58. The pressures applied to flanges 14, 16 are transmitted via the separating diaphragms 54, 58 to the volumes 56, 60 behind the separating diaphragms, and from these volumes to volumes 74, 76 between the fixed disks 24, 28 and the measuring diaphragm 67. The volumes 56, 60 are connected to volumes 74, 76 via a plurality of upper and lower connection holes 52, 53. The volumes 56, 60, 74 and 76 are filled with an incompressible pressure transmitting liquid such as silicon oil. The liquid within the volumes allows pressure applied to flanges 14, 16 to displace measuring diaphragm 67. The deflection is proportional to the pressure difference applied to the two flanges 14, 16.

The measuring diaphragm deflection, and thereby the applied pressure differential, is typically detected by measuring changes in capacitance which result from the deflection. Electrodes 64, 70 etched onto the inner surface of the fixed disks 24, 28 nearest the measuring diaphragm 67 and electrodes 66, 68 etched onto the upper and lower faces of the measuring diaphragm 67 form the capacitive plates of the transducer. The electrodes are connected to external circuitry shown generally at 18 by wires 38 which contact an extended conductive portion 73 of the electrodes as shown in FIG. 4. The electrodes may be etched using thick film screen printing technology with a gold or platinum resinate paste, or by other suitable techniques. As the measuring diaphragm is deflected, the distance between the capacitive plates changes, and the change in capacitance can be readily detected by external circuitry. Alternatively, resistive pick-up can be used to monitor diaphragm deflection. Resistors can be formed on one or both sides of the measuring diaphragm 67 using thick film screen printing technology, sputtering technology, or other suitable techniques. A bridge circuit can then detect resistance changes resulting from movement of the diaphragm.

The successful operation of the exemplary sensor described above is dependent upon removing any pressure effects unrelated to desired pressure inputs which might influence the position of the measuring diaphragm. To this end, the separating diaphragms 54, 58 are hermetically sealed to the fixed disks 24, 28 using glue, active soldering or diffusion welding. O-rings 50, 48 serve to form pressure seals between the flanges 14, 16 and the separating diaphragms 54, 58. The fixed disks 24, 28 are thus stress-free and float between the O-ring seals 50, 48.

Figure 3:
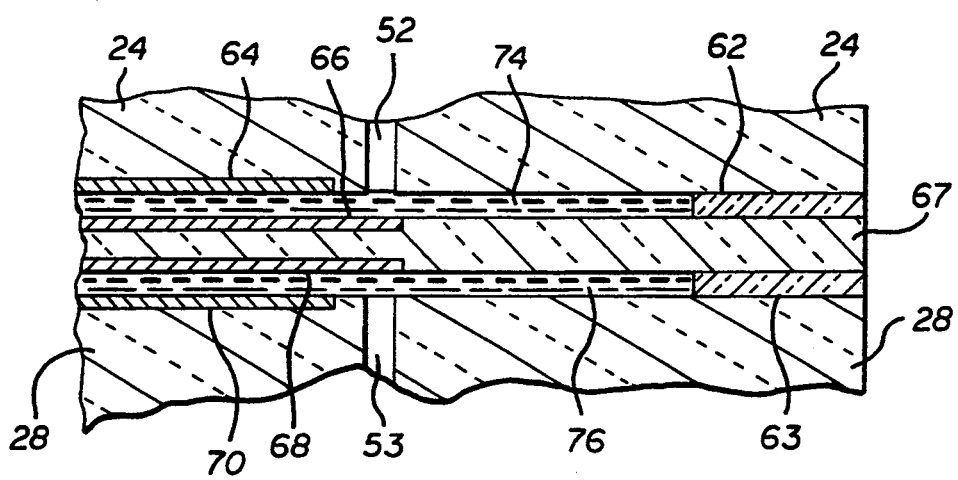
FIG. 3 is a detailed view of sealing means of the exemplary pressure transducer of FIG. 1.

The fixed disks 24, 28 and the measuring diaphragm 67 are sealed together by glass frit sealing means 62, 63 formed by a glass soldering procedure. The sealing means 62, 63 are shown in greater detail in FIG. 3. Alternatively, the sealing means can be formed from a conductive material using an active soldering procedure under vacuum or protective gas. The conductive materials which could be used include, but are not limited to, the following (numbers in parentheses indicating approximate percentage concentrations of the respective elements): CuTi (70/30), CuAgTi (55/40/5), NiTi (45/55), NiZr (17/83), and AgCuInTi (74/19/4/3). The active soldering temperature of the particular conductive material should be lower than that of the transducer electrode material, since the two materials will be in contact during soldering. In addition to active soldering, a conductive material sealing means could also be constructed using other techniques such as direct copper bonding, conventional soldering after pre-metallizing the fixed disks and diaphragm, or screen printed conductive glasses or resistive pastes.

In order to improve the reliability of the glass frit sealing means 62, 63 a pre-stress mechanism 39 has been incorporated into the exemplary pressure transducer of FIG. 1. The pre-stress mechanism shown generally at 39 consists of an upper pre-stress member 40 and a lower pre-stress member 42, both of which are secured together via welds 46 while under appropriate compression. In this particular embodiment, the inner surface of the upper pre-stress element 40 contacts the outer surface of the upper fixed disk 24 and the inner surface of the lower pre-stress element 42 contacts the outer surface of the lower fixed disk 28. Other arrangements of these elements can easily be formed to accommodate different transducer configurations. For example, in a single sided pressure transducer with a single fixed disk, the mechanism could be suitably modified such that the upper or lower pre-stress member contacts another fixed surface within the transducer instead of a second fixed disk. Furthermore, the connection of the upper and lower elements is not limited to welding. Other connecting means can be used, including but not limited to soldering, bolts and clamps.

The operation of the exemplary pre-stress mechanism within the transducer of FIG. 1 is as follows. An application of high pressure to either pressure input flange 14, 16 will normally cause the diaphragm to bottom out against the opposite fixed disk 24, 28. The diaphragm is designed to bottom out in this manner to prevent damage to it in the event of overpressure, as is well known in the art. However, there is still the chance that the glass frit sealing means 62, 63 will be damaged as a result of the overpressure. In accordance with the present invention, the glass frit sealing means 62, 63 is continuously subject to a suitable compression force as a result of the pre-stress mechanism 39. The glass frit sealing means will therefore be considerably more resistant to pressure than it would in a non-compressed condition. The transducer as a whole will thus be much better able to survive exposure to high pressure on either pressure input flange 14, 16.

The amount of pre-stress which should be applied to the sealing means 62, 63 varies depending upon a number of factors. For the exemplary sensor of FIG. 1, a pressure of between 5 and 15 kN was used. The device incorporating this pre-stress would be able to withstand single sided pressure application of about 50 to 250 Bar, as opposed to a similar device without the pre-stress mechanism which would only be able to resist pressure applications of about 5 to 25 Bar. A pre-stress compression within this range will thus assure a substantial increase in high pressure resistance without endangering the sealing means itself. Other types of sealing means may require appropriate adjustment in the amount of applied pre-stress force.

The pre-stress mechanism 39 is preferably formed from a material which has a coefficient of expansion matched to that of the sensing body disks 24, 28 and the measuring diaphragm 67. The amount of pre-stress applied to the transducer sealing means will then remain relatively constant despite changes in operating temperature. In the preferred embodiment discussed herein, the material used is Ni46. Other suitable materials, including but not limited to Kovar, Ni49 could also be used.

In the preferred embodiment of the pre-stress mechanism 39 shown in FIG. 1, there is an additional feature which provides further protection against the application of high pressure. The surface 71 of pre-stress mechanism 39 will bottom out against flange surface 73 in the event an excessive single sided pressure is applied to flange 14. This is possible since the pre-stress mechanism 39 surrounds the fixed disks 24, 28, and is arranged between the disks and the input flanges 14, 16. Using this construction, it is possible to allow the pre-stress mechanism to limit the overpressure which can be applied to the measuring diaphragm 67 while also providing the additional seal strength as discussed above.

A sectional view of the exemplary pre-stressed transducer of FIG. 1 is shown in FIG. 4. Since the exemplary sensor of FIG. 1 is cylindrical in shape, the pre-stress members 40, 42 are also cylindrical in the preferred embodiment shown. As shown in FIG. 4, the pre-stress mechanism surrounds the transducer upper sealing means 62 and is secured to the tube 20. The break in the pre-stress mechanism at the tube 20 permits the connection of wires 38 to conductive plate 66 via conductive extension 73. This preferred arrangement permits the pre-stress mechanism to apply an even pressure on all sides of the sealing means. However, it should be understood that this is by way of example and not limitation. The mechanism of the present invention could be implemented using several upper and lower pre-stress elements spaced around the periphery of the transducer rather than a single upper and lower element completely surrounding it as shown in FIG. 4. These or many other suitable arrangements could be contrived to provide a relatively even distribution of pre-stress force across the sealing means. Furthermore, the shape of the pre-stress mechanism may be adjusted to suit any shape of pressure transducer.

The pre-stress mechanism of the present invention is preferably formed in accordance with the following method. The upper and lower pre-stress elements are provided in a shape and arrangement compatible with the design features of the particular transducer. The two elements are brought together under pressure and in contact with the sensing body of the transducer, and secured using a weld or other technique which will permit the pressure to be reliably maintained. The external arrangement of the pre-stress mechanism can, but need not, be designed in such a way that it also accomplishes a bottoming out function. The transducer will be significantly stronger and resistant to pressure as a result of the application of this method.

It will be understood by those skilled in the art that many alternate implementations of the present invention are possible without deviating from the scope of the invention, which is limited only by the appended claims.

What is claimed is:

1. A pre-stressed capacitive pressure transducer capable of withstanding high pressure, said transducer comprising:
   a flexible ceramic diaphragm;
   a pair of fixed ceramic disks mounted spaced on either side of said diaphragm, said diaphragm and at least one of said fixed disks having conductive plates thereon, so that the capacitance between said conductive plates varies as said diaphragm flexes;
   a pair of glass frit seals which secure together and space apart said diaphragm and said two disks;
   pressure means for applying pressure to be measured to said diaphragm;
   upper and lower cylindrical pre-stress members overlapping one another, and bearing on outer surfaces of said two disks;
   a weld which secures said two pre-stress members together under a substantial compressive force, the compressive force thereby being applied to said two disks and said diaphragm;
   wherein said pre-stress members protect said transducer against failure of said glass frit seals under high internal pressure;
   a pair of pressure input flanges which apply pressure to be measured by said transducer;
   sealing means for sealing inner surfaces of said input flanges to outer surfaces of said disks;
   securing means for securing said pressure input flanges together;
   wherein at least one of said pre-stress members includes an outer surface which is positioned and configured to contact an inner surface of one of said pressure input flanges in the event an excessively high external pressure is applied to said transducer, wherein further movement of said disk in contact with said pre-stress member is prevented, thereby limiting the amount of external pressure transmitted to said diaphragm and said glass frit seals.

2. A pre-stressed capacitive pressure transducer capable of withstanding high pressure, said transducer comprising:
   a flexible diaphragm;
   at least one fixed disk mounted spaced on one side of said diaphragm, said diaphragm and said disk having conductive plates thereon, so that the capacitance between said conductive plates varies as said diaphragm flexes;
   sealing means for securing together and spacing apart said diaphragm and said disk;
   upper and lower cylindrical pre-stress members overlapping one another, substantially surrounding and applying inwardly directed force to outer surfaces of said diaphragm and said disk;
   securing means for securing said pre-stress members together under a substantial compressive force to thereby apply the force to said diaphragm, said disk and said sealing means;
   wherein said pre-stress members protect said transducer against failure of said sealing means under high internal pressure;
   a pressure input flange for applying pressure to be measured by said transducer, said input flange having an inner surface adjacent an outer surface of said disk;
   sealing means for sealing together said input flange inner surface and said disk outer surface; and
   securing means for securing said pressure input flange to said disk and said diaphragm;
   wherein at least one of said pre-stress members includes an outer surface which is positioned and configured to contact an inner surface of said pressure input flange in the event an excessively high external pressure is applied to said transducer, wherein further movement of said disk in contact with said pre-stress member is prevented, thereby limiting the amount of external pressure transmitted to said diaphragm, and said sealing means securing together and spacing apart said diaphragm and said disk.

3. A pre-stressed capacitive pressure transducer capable of withstanding high pressure, said transducer comprising:
   a flexible ceramic diaphragm;
   a pair of fixed ceramic disks mounted spaced on either side of said diaphragm, said diaphragm and at least one of said fixed disks having conductive plates thereon, so that the capacitance between said conductive plates varies as said diaphragm flexes;
   a pair of glass frit seals which secure together and space apart said diaphragm and said disks;
   pressure means for applying pressure to be measured to said diaphragm;
   upper and lower pre-stress members directly bearing on outer peripheries of said disks; and securing means for securing said pre-stress members together under a substantial compressive force, said compressive force thereby being applied to said disks and said diaphragm;

wherein said pre-stress members protect said transducer against failure of said glass frit seals under high internal pressure;

wherein at least one of said pre-stress members includes an outer surface which is positioned and configured to contact an inner surface of one of said input flanges in the event an excessively high external pressure is applied to said pressure transducer, wherein further movement of said disk in contact with said pre-stress member is prevented, thereby limiting the amount of external pressure transmitted to said diaphragm and said glass frit seals.

* * * * *